US012783856B2

(12) United States Patent
White, Jr. et al.

(10) Patent No.: US 12,783,856 B2
(45) Date of Patent: Nov. 3, 2026

(54) METHOD TO DETECT AND FIX HALLUCINATIONS IN GENERATIVE LARGE LANGUAGE MODELS

(71) Applicant: Cisco Technology, Inc., San Jose, CA (US)

(72) Inventors: David C. White, Jr., St. Petersburg, FL (US); Mohammed Izzat Hamzeh, Woluwe-Saint-Lambert (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 716 days.

(21) Appl. No.: 18/358,410

(22) Filed: Jul. 25, 2023

(65) Prior Publication Data

US 2024/0386253 A1 Nov. 21, 2024

Related U.S. Application Data

(60) Provisional application No. 63/502,702, filed on May 17, 2023.

(51) Int. Cl.
*G06N 3/0475* (2023.01)
*G06F 40/166* (2020.01)
(Continued)

(52) U.S. Cl.
CPC ......... *G06N 3/0475* (2023.01); *G06F 40/166* (2020.01); *G06F 40/289* (2020.01); *G06F 40/30* (2020.01); *G06F 40/40* (2020.01)

(58) Field of Classification Search
CPC ...... G06N 3/0475; G06N 20/00; G06N 20/10; G06N 20/20; G06N 3/088; G06N 3/092;
(Continued)

(56) References Cited

U.S. PATENT DOCUMENTS 10,209,974 B1 * 2/2019 Patton ........................ G06F 8/60
12,487,817 B2 * 12/2025 Groenewegen ........... G06F 8/20
(Continued)

FOREIGN PATENT DOCUMENTS

CA 3060144 A1 * 4/2020 ............. G06N 3/088
CA 3231830 A1 * 2/2021 ............. G06N 3/092
(Continued)

OTHER PUBLICATIONS

Manakul et al, "SELFCHECKGPT: Zero-Resource Black-Box Hallucination Detection for Generative Large Language Models," ALTA Institute, Department of Engineering, University of Cambridge, Mar. 2023 (Year: 2023).*
(Continued)

*Primary Examiner* — Steven P Sax
(74) *Attorney, Agent, or Firm* — Edell, Shapiro & Finnan, LLC

(57) ABSTRACT

A system and method to detect a generative model's output to see if it is hallucinating or not, and to check the facts listed in the model. Additionally, when a hallucination or incorrect fact is detected, the correct fact can be applied as context to ask the model to regenerate the output again, taking the fact into consideration while also optionally lowering the temperature or increasing the top-k values from which to choose. A method is provided comprising: obtaining output produced by the generative model based on input provided to the generative model; performing summarization and topic extraction on the output to obtain one or more topics; performing fact checking on each of the one or more topics to produce a consolidated ground truth context; and declaring that the generative model is hallucinating or not based on the consolidated ground truth context.

20 Claims, 9 Drawing Sheets

(51) Int. Cl.

*G06F 40/289* (2020.01)
*G06F 40/30* (2020.01)
*G06F 40/40* (2020.01)

(58) Field of Classification Search

CPC .......... G06N 3/084; G06N 5/04; G06F 40/30; G06F 40/166; G06F 40/289; G06F 40/40; G06F 16/24553; G06F 16/36; G06F 16/332

See application file for complete search history.

(56) References Cited

U.S. PATENT DOCUMENTS

| | | | | |
|---|---|---|---|---|
| 2021/0192140 | A1 | 6/2021 | Galley et al. | |
| 2021/0342380 | A1* | 11/2021 | Luus | G06F 16/367 |
| 2022/0107802 | A1* | 4/2022 | Rao | G06F 16/907 |
| 2022/0121884 | A1* | 4/2022 | Zadeh | G06F 16/3344 |
| 2022/0164546 | A1* | 5/2022 | Jiang | G06F 40/40 |
| 2022/0164643 | A1* | 5/2022 | Charnock | G06F 16/951 |
| 2022/0391591 | A1* | 12/2022 | Ronen | G06F 16/345 |
| 2022/0414492 | A1* | 12/2022 | Jezewski | G06N 5/04 |
| 2023/0054068 | A1 | 2/2023 | Zheng et al. | |
| 2023/0083000 | A1 | 3/2023 | Fujimoto et al. | |
| 2023/0119109 | A1 | 4/2023 | Choubey et al. | |
| 2023/0145919 | A1* | 5/2023 | Ozay | G06N 3/0455 706/12 |
| 2023/0401213 | A1* | 12/2023 | Shrivatsa Bhargav | G06F 16/24553 |
| 2024/0184988 | A1* | 6/2024 | Sridhar | G06F 16/36 |
| 2024/0330755 | A1* | 10/2024 | Kumar | G06N 20/00 |
| 2024/0346232 | A1* | 10/2024 | Asi | G06F 40/30 |

FOREIGN PATENT DOCUMENTS

| | | | | | |
|---|---|---|---|---|---|
| CA | 3153903 | A1 | * | 4/2021 | G06V 10/82 |
| CA | 3172730 | A1 | * | 9/2021 | G06F 16/345 |
| CA | 3220728 | A1 | * | 3/2023 | G06F 40/284 |
| KR | 20240023535 | A | * | 2/2024 | G06F 16/332 |
| WO | WO-2023023379 | A1 | * | 2/2023 | G06F 40/258 |
| WO | WO-2024136871 | A1 | * | 6/2024 | G06F 40/216 |

OTHER PUBLICATIONS

Thorne et al, "FEVER: alarge-scale dataset for Fact Extraction and VERification," Department of Computer Science, University of Sheffield, Amazon Research Cambridge, 2018 (Year: 2018).*

Kryscinski et al, "Evaluating the Factual Consistency of Abstractive Text Summarization," Salesforce Research, 2020 (Year: 2020).*

Afzal A., et al., "Challenges in Domain-Specific Abstractive Summarization and How to Overcome Them", Proceedings of the 15th International Conference on Agents and Artificial Intelligence (ICAART 2023), vol. 3, 2023, Feb. 2023, pp. 682-689.

Neto J.A.R.N., "ChatGTP and the Generative AI Hallucinations", ChatGPT Learning, Mar. 15, 2023, 13 Pages.

Pearce H., et al., "Examining Zero-Shot Vulnerability Repair with Large Language Models", https://doi.org/10.48550/arXiv.2112.02125, Dec. 2021, 18 Pages.

* cited by examiner

METHOD TO DETECT AND FIX HALLUCINATIONS IN GENERATIVE LARGE LANGUAGE MODELS

CROSS REFERENCE TO RELATED APPLICATION

This application claims priority to U.S. Provisional Application No. 63/502,702, filed May 17, 2023, entitled "Method to Detect and Fix Hallucinations in Generative Large Language Models," the entirety of which is incorporated herein by reference.

TECHNICAL FIELD

The present disclosure relates to Large Language Models (LLMs) or generative artificial intelligence models and related services.

BACKGROUND

Large Language Models (LLM) like GPT-4 are fantastic at generating text. In fact, they are often even better at generating well formed, coherent text than a lot of humans are. However, the downside is that when asked a question, the models always generate a response-which appears authoritative. This is where humans are challenged. If they are asking a question because they really do not know the answer, then they could take whatever the model outputs as the truth. However, subject matter experts can tell when the model is providing an incorrect (or made up answer)—which is called a hallucination.

A generative pre-trained transformer model generates text and is unable to determine the accuracy (or correctness) of its answer. This is a big problem as some consumers who take the output of the model believe it as fact (and could indeed spread this misinformation around). A way of validating the factual accuracy of the output of a generative model has utility for numerous applications.

DESCRIPTION OF EXAMPLE EMBODIMENTS

Overview

Presented herein are a system and method to detect a generative model's output to detect if it is hallucinating or not, and to check the facts used by the model. Additionally, when a hallucination or incorrect fact is detected, the correct fact can be applied as context to ask/prompt the model to regenerate the output again, taking the fact into consideration while also optionally lowering the temperature or increasing the number of top-k values from which to choose.

In one form, a method is provided comprising: obtaining output produced by the generative model based on input provided to the generative model; performing summarization and topic extraction on the output to obtain one or more topics; performing fact checking on each of the one or more topics to produce a consolidated ground truth context; and declaring that the generative model is hallucinating or not based on the consolidated ground truth context.

EXAMPLE EMBODIMENTS

Generative artificial intelligence (AI) models are good at generating text. Often the text generated is very readable, actionable and appears to be accurate. GPT-4 for example, generates very well structured English sentences.

Because the model is so good at generating well formatted sentences, it lulls the user into believing the output. Especially since those asking the question are usually doing so because they themselves do not know the answer. This becomes dangerous as there is a false sense of trust built between the model and the user.

Consider an example hallucination of GPT-4. If one asked it:

"When did Leonardo da Vinci paint the Mona Lisa?"

and it responded:

"Leonardo da Vinci painted the Mona Lisa in 1815."

One might tend to believe that answer. However, the Mona Lisa was believed to be painted between 1503 and 1506. Therefore, the model is doing what is called hallucinating.

Figure 1:
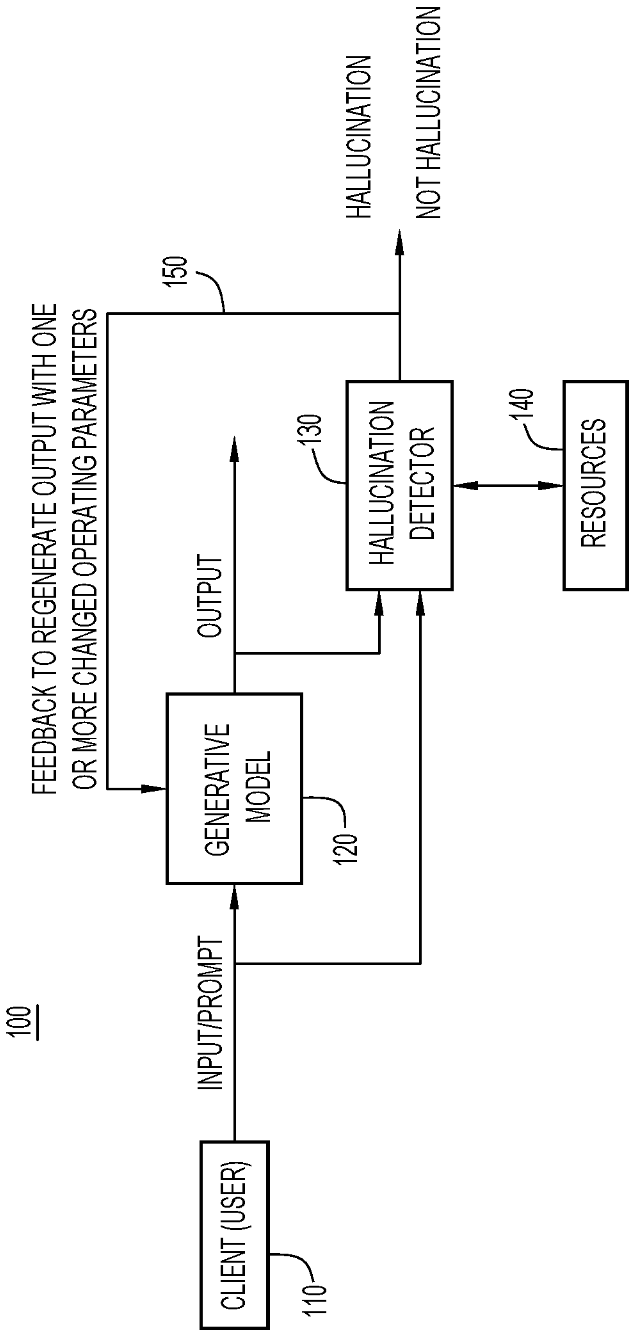
FIG. 1 is a system block diagram showing a hallucination detector to detect when a generative model is hallucinating, according to an example embodiment.

Presented herein are a system and method that detect and can correct these hallucinations—while still allowing the other benefits of the generative type models: excellent sentence composition and structure, formatting, etc. Reference is made to FIG. 1 that shows a high-level block diagram of a system 100 according to an example embodiment. The system 100 includes a client 110 that is associated with a user seeking to use a generative model 120. The generative model 120 may be implemented by software running on one or more servers in the cloud or in an enterprise network. A hallucination detector 130 is coupled to receive input from both the input/prompt to the generative model 120 and the output from the generative model 120. The hallucination detector 130 may access one or more resources 140 to assist in making a determination whether the generative model 120 is generating output indicating that the generative model 120 is hallucinating. The resources 140 may be external to the hallucination detector 130, such as one or more public knowledge bases or internal to an environment where the hallucination detector 130 is operating, such as in an enterprise network. The output of the hallucination detector 130 may be a declaration/indication that the output of the generative model 120 is indicative of a Hallucination or is indicative of Not Hallucination. Moreover, when the hallucination detector 130 detects that the output is indicative of Hallucination, the hallucination detector 130 may provide feedback 150 that causes a prompt or suitable control(s) to the generative model 120 to regenerate the output using one or more changed operating parameters, as described in more detail below. The hallucination detector 130 may take the form of a computing apparatus that includes at least one computing processor that executes software instructions that enable the computing apparatus to perform a hallucination detection process.

Figure 2:
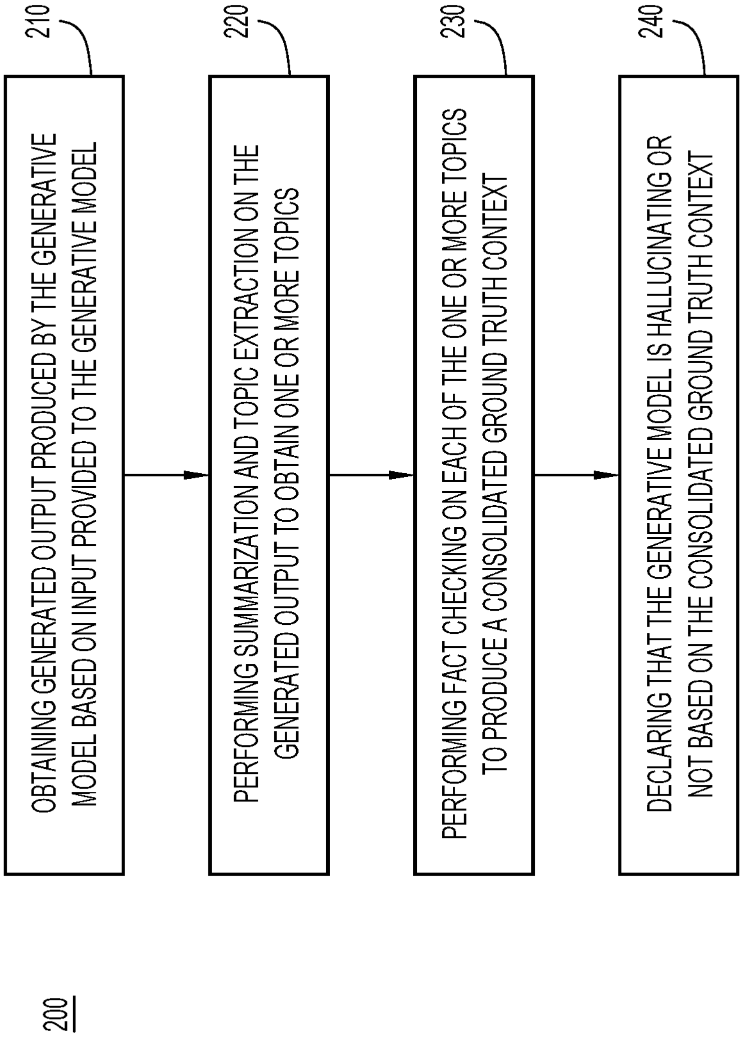
FIG. 2 is a high-level flow chart of a method for detecting when a generative model is hallucinating, according to an example embodiment.

FIG. 2 illustrates a flow chart that depicts, at a high-level, a computer-implemented method 200 for determining when a generative model (large language model) is hallucinating, according to an example embodiment. The generative model, LLM, etc., may be running as a service on one or more computing devices that are accessible via the Internet or private network. Other terms for a generative model include an artificial intelligence (AI) service, LLM service, AI platform, etc.

The method 200 includes, at step 210, obtaining output produced by the generative model based on input provided to the generative model. The input and output may be text, but it is also envisioned that the input and output may be audio or video. At step 220, the method 200 includes performing summarization and topic extraction on the output to obtain one or more topics. At step 230, the method 200 includes performing fact checking on each of the one or more topics to produce a consolidated ground truth context. At step 240, the method 200 includes declaring (detecting or determining) that the generative model is hallucinating or not hallucinating based on the consolidated ground truth context produced in step 230.

Thus, the method 200 evaluates the input into the generative model and the output of the generative model. The output may be analyzed with a machine learning (ML) model that first analyzes the structure of the output: length, content similarity between paragraphs, type of text (code, images, text, etc.). Based on output length, it may be determined that the output is to be broken into chunks and clustered for validation of different parts independently. For a short question and answer like the example above, there would be no need for any chunking. Another term for "chunking" includes dividing or grouping.

Figure 3:
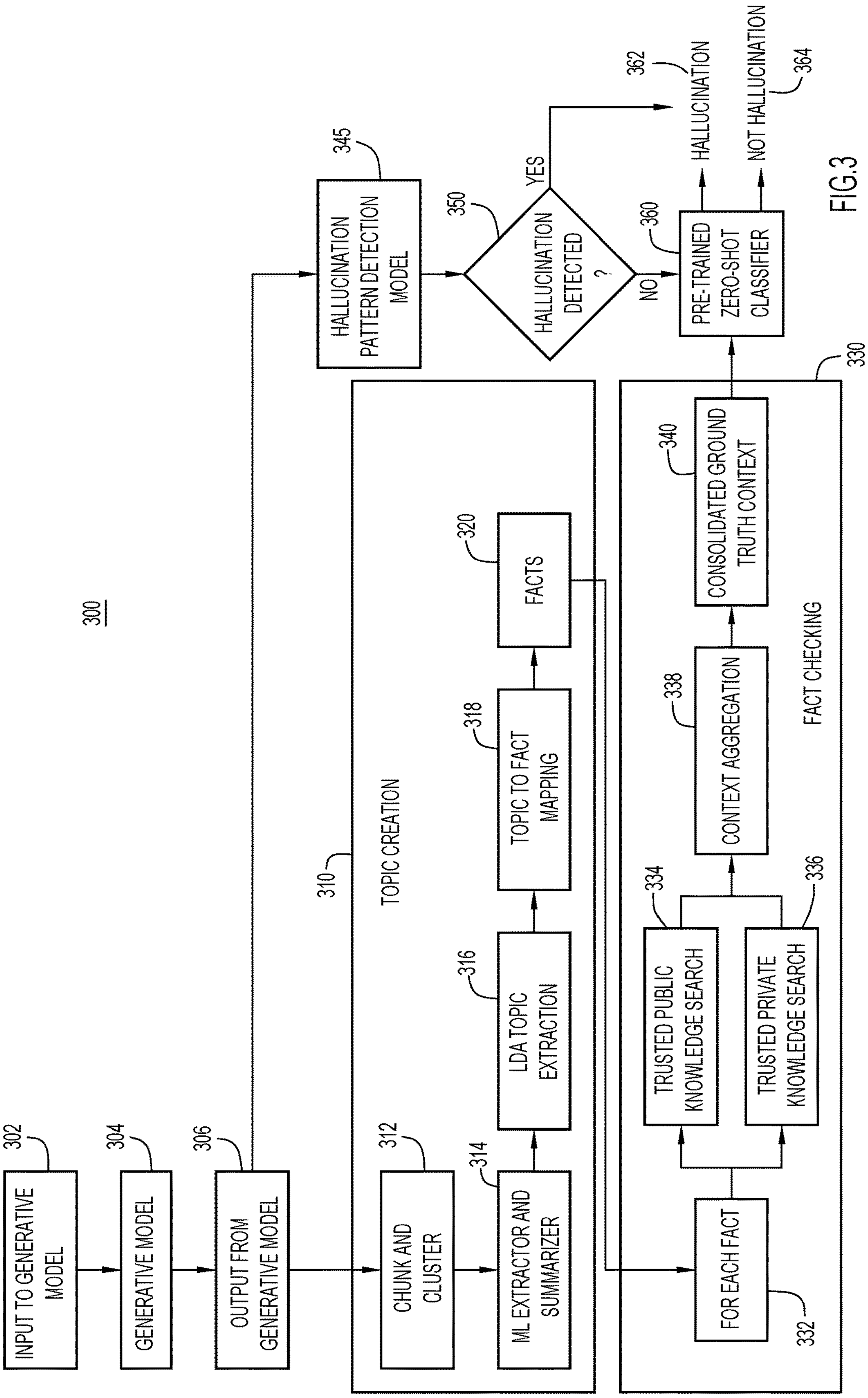
FIG. 3 is a more comprehensive flow diagram of a method for detecting when a generative model is hallucinating, according to an example embodiment.

FIG. 3 illustrates a diagram of a more comprehensive operational flow 300 of these techniques. At step 302, an input to the generative model is obtained. The input is obtained from a user and may take the form of text or audio/video from which text is derived. At step 304, the input is run through the generative model and an output from the generative model is obtained at step 306.

Next, topic creation 310 begins. Topic creation 310 includes a chunk and cluster step 312, followed by a ML-based extractor and summarizer step 314. The output of the extractor and summarizer step 314 is provided to a Latent Dirichlet Allocation (LDA) topic extraction step 316 that applies Bayesian statistical techniques in which words are grouped into a topic. At step 318, a topic to fact mapping is performed on the topic output from step 316 and including additional text (such as the entire sentence, as an example) to obtain a set of facts 320 associated with each extracted topic for further analysis.

A fact checking phase 330 is next performed using the facts 320 obtained from the topic creation phase. At step 332, for each fact, searches are made in a trusted public knowledge base at step 334 and/or a trusted private knowledge base at step 336. The results of the searches at steps 334 and 336 are aggregated in a context aggregation step 338 to obtain a consolidated ground truth context 340.

Some of the steps in FIG. 3 are optional, such as topic creation 310. For example, if the LLM token input size is large enough, then topic creation 310 is not performed and the process can go from step 306 directly to step 332.

As shown in FIG. 3, the output of generative model at step 306 is also run through a hallucination pattern detection model 345. The hallucination pattern detection model 345 is described in more detail below.

At step 350, using the output of the hallucination pattern detection model, a preliminary determination is made whether a hallucination of the generative model is detected. If, at step 350, a hallucination is not detected based on the hallucination pattern detection model, then the process continues where the consolidated ground truth context is run through a pre-trained zero-shot classifier 360. A zero-shot classifier is a model that is trained on a set of labeled examples (using natural language processing, for example) that can classify new examples from previously unseen classes. Thus, the pre-trained zero-shot classifier 360 takes the consolidated ground truth context to determine whether it is indicative of a hallucination at 362 or not indicative of a hallucination at 364. Thus, a hallucination can be detected at step 350 (without passing through the pre-trained zero-shot classifier 360) or by applying the pre-trained zero-shot classifier 360 on the consolidated ground truth context if step 350 does not detect a hallucination based on the output of the hallucination pattern detection model 345. Moreover, the hallucination detection 362 and not hallucination detection 364 may have an associated probability or confidence, as described further below.

Topic Creation

Figure 4:
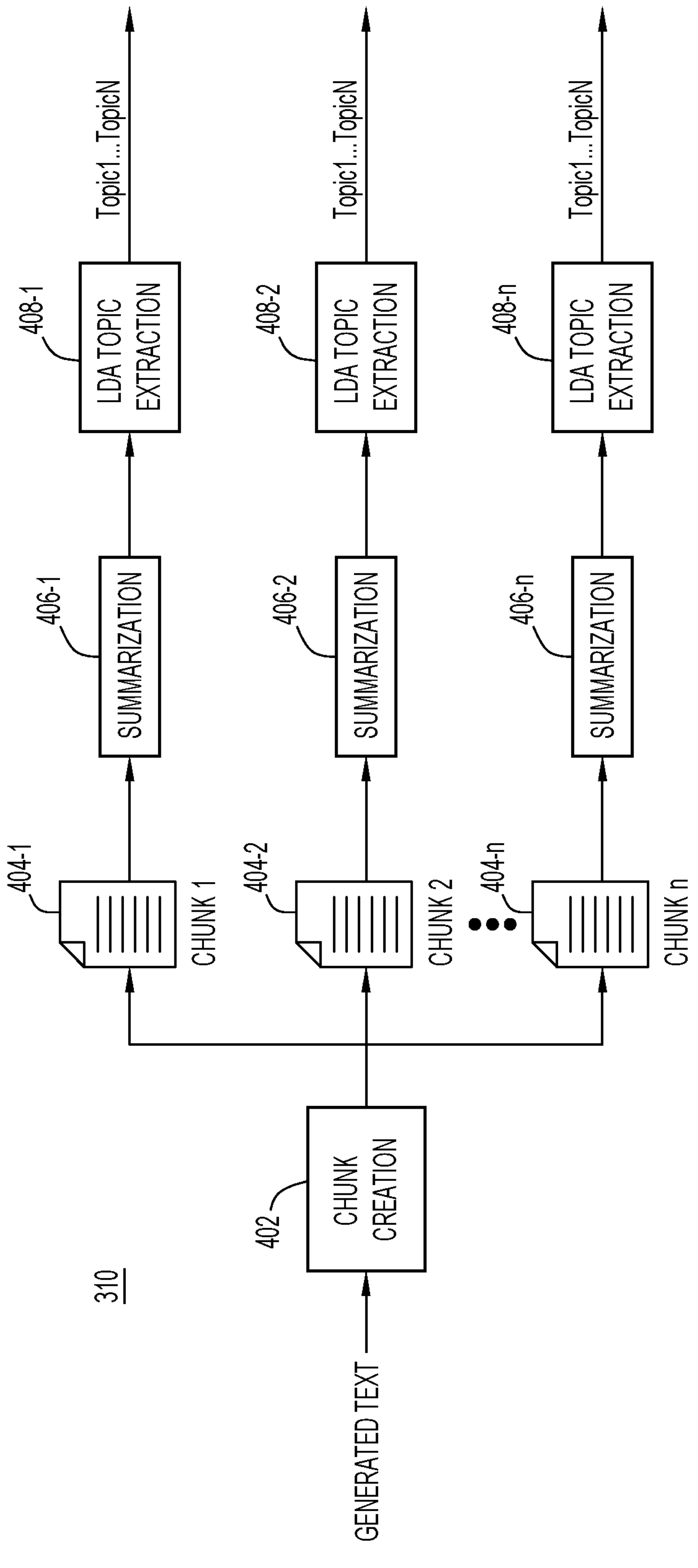
FIG. 4 is a flow diagram for a topic creation phase of the method depicted in FIG. 3, according to an example embodiment.

Turning now to FIG. 4, a further description is now provided for topic creation 310. The text output from the generative model is obtained and it is determined whether to chunk it into smaller segments (and how many chunks). If the text content output from the generative model is short/concise, then it may be determined that it is not necessary to break it into a plurality of chunks. However, assuming that the output text from the generative model is sufficiently large relative to the pre-trained zero shot classifier input token size, it will then be split into chunks, then at step 402, the text is divided into chunks 404-1, 404-2, to **404-*n*. Each chunk 404-1 to 404-*n* is then run through a summarization step 406-1, 406-2, to 406-*n*, respectively, and then to a LDA topic extraction step 408-1, 408-2, to 408-*n*, respectively, to create one or more topics. Thus, each chunk 404-1 to 404-*n*** may result in one or more topics, shown as Topic1 . . . . TopicN, though it should be understood that the number of topics created for each chunk may not be the same across the chunks.

Fact Checking

Figure 5:
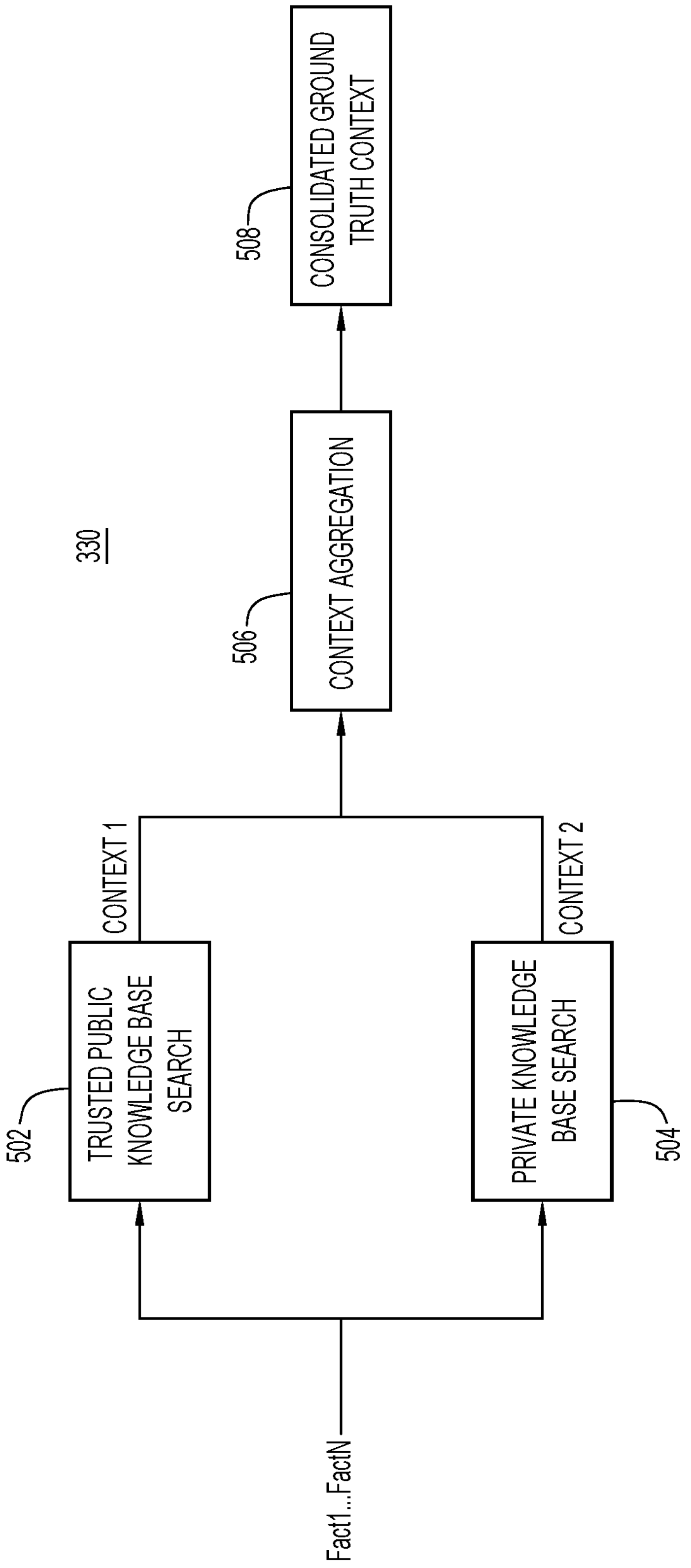
FIG. 5 is a flow diagram for a fact checking phase of the method depicted in FIG. 3, according to an example embodiment.

With reference to FIG. 5, the fact checking phase 330 is now described in more detail. To perform fact checking, a search is made of knowledge bases, and the search could be on one or more public knowledge bases available on the internet (at step 502) or one or more internal/private knowledge bases (at step 504). Summarization of the topic can help with the selection of appropriate knowledge base. Fact checking may be using each of the one or more topics extracted for each of chunk derived from the output of the generative model.

As an example, if the question or topic is medical related, then the search would include trusted medical knowledge bases, like U.S. National Institute of Health; PubMed Central; Infermedica.com; webmd.com, etc. These trusted public knowledge bases are searched using search strings created from the extracted facts, Fact1 . . . . FactN.

Optionally, for localized enterprise use, the search can include one or more internal knowledge bases. Thus, answering basic questions might involve searching the public knowledge base, while answering questions regarding software bugs may involve internal knowledge base search and some use cases may require searching both public and internal/private knowledge bases. A search made of a trusted public knowledge may return a first context (Context1), and a search is made of an internal or private knowledge base may return a second context (Context2).

At step 506, the contexts obtained from the searches of one or more trusted public knowledge bases and/or one or more internal private knowledge bases are aggregated at step 506. The aggregation of the contexts results in a consolidated ground truth context 508 that is compared against the comparable Generated Text chunk, as explained below.

Fact Checking Comparison

Figure 6:
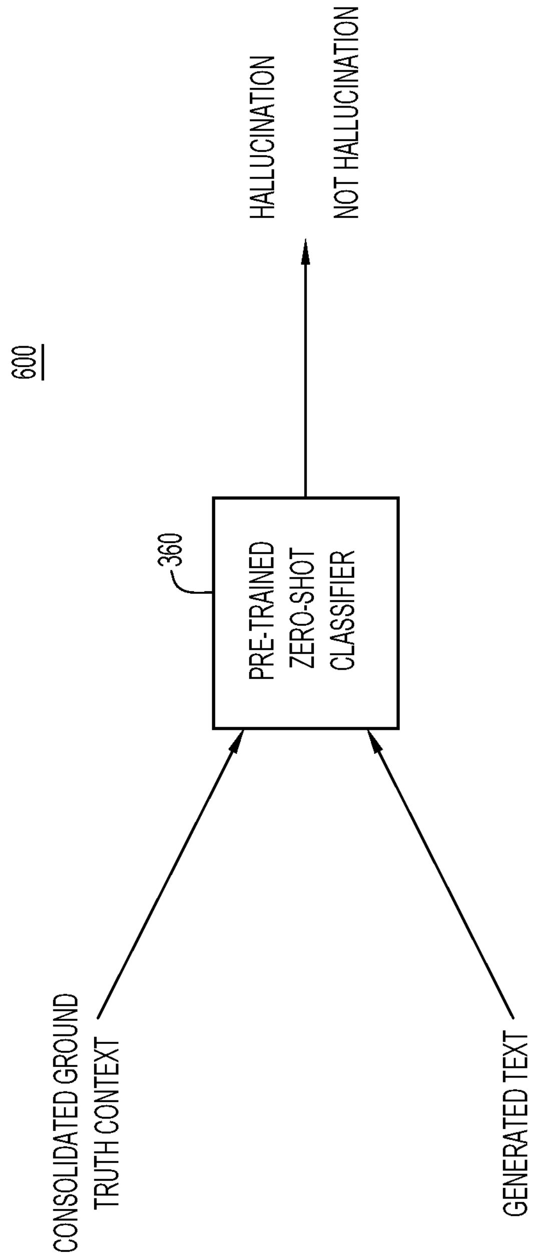
FIG. 6 is a flow diagram depicting operation of a pre-trained zero-shot classifier to determine whether or not the generated output of a generative model is indicative of a hallucination, according to an example embodiment.

With reference to FIG. 6, once the consolidated ground truth context is generated, a fact checking comparison process 600 is performed. A pre-trained large language model can be used as a zero-shot classifier 360 to determine whether the answer provided by the generative model is a hallucination or not. The process 600 is performed by providing the zero-shot classifier 360 (also referred to as a second LLM) with the consolidated ground truth context, the generated text output by the generative model and a system prompt requesting the zero-shot classifier to provide a classification output with a probability of its prediction.

The following is an example of this pre-trained zero-shot classifier:

System Prompt: Act as a Machine Learning Classifier responsible for identifying if an Answer is Hallucination or Not_Hallucination using consolidated ground truth context. The input contains two classes:

Hallucination

Not_Hallucination along with the probability of each class.

User Prompt:

Answer: Leonardo da Vinci painted the Mona Lisa in 1815.

Consolidated Ground Truth Context: Leonardo da Vinci did start painting the Mona Lisa in 1503 or 1504 in the Italian city, but in 1516 he was invited by King François I to work in France, and scholars believe he finished the painting there, and there it has remained.

Model Output:

Hallucination: 0.9

Not_Hallucination: 0.1

Input to the pre-trained zero-shot classifier is the request to determine if the Answer (provided via the user prompt) is a hallucination or not based on the consolidated ground truth context.

Figure 7:
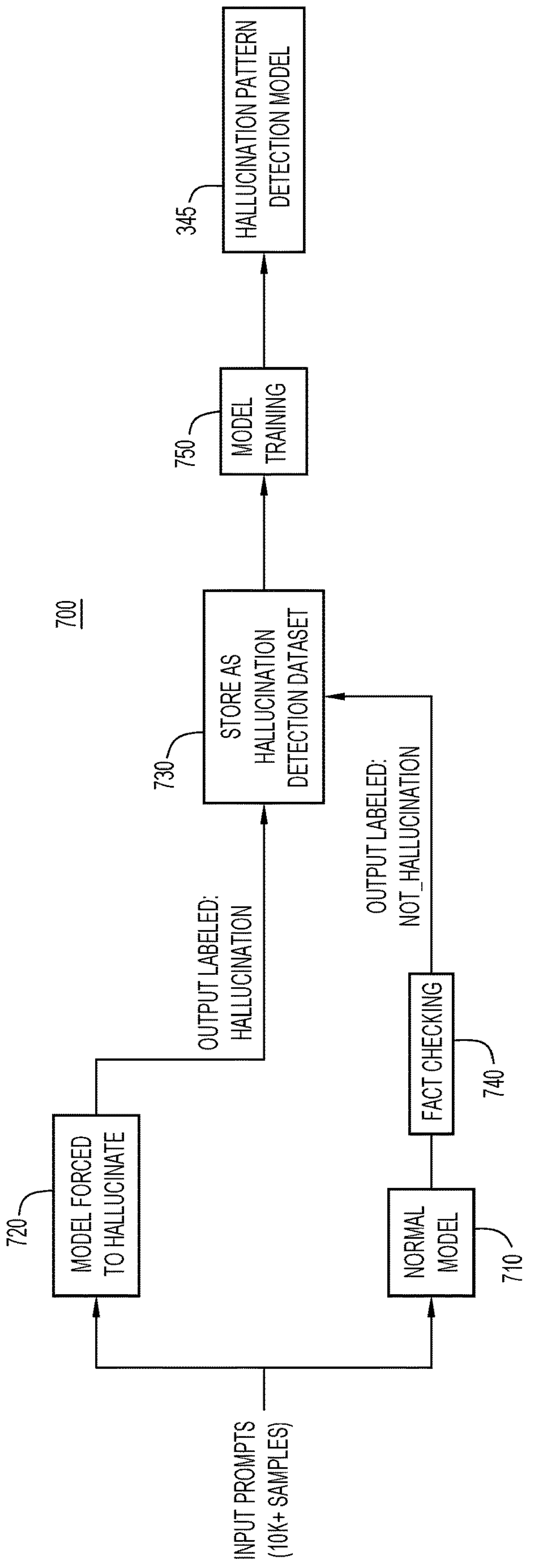
FIG. 7 illustrates a process to train a hallucination pattern detection model that may be used in the process depicted in FIG. 3, according to an example embodiment.

A third ML model can be trained to detect hallucination patterns in the text that are not necessarily factual issues. This model can detect incorrectly formatted text or signals in the text that indicate hallucination. Reference is now made to FIG. 7 for a description of a process 700 to train a hallucination pattern detection model, e.g., the hallucination pattern detection model 345 shown in FIG. 3.

A set of input prompts (e.g., ten thousand samples) are provided as input to a normal generative model at step 710 and to a generative model that is forced to hallucinate at step 720. Samples of the outputs generated by the model that is forced to hallucinate (at step 720) are labeled as such (Hallucination) and stored in a dataset called a hallucination detection dataset 730.

There are several ways to force a generative model to hallucinate:

1. Increase temperature of the computing device(s) that run the model (e.g., 1.5 or 2.0 degrees) to encourage more diverse outputs.
2. Lower the number of top-k values so as to force the model to choose from fewer possible tokens, increasing hallucination chances.
3. Prompt engineering: Design prompts that encourage creativity or unusual content.
4. Fine-tuning: Train the model on a dataset containing hallucinated or creative text.

The outputs of the normal generative model (using the same set of prompts as provided to the model forced to hallucinate) are referred to as the accurate answers, and they are run through a fact checking step 740. The outputs of the fact checking step 740 are labeled as such (Not_Hallucination) and stored in the hallucination detection dataset 730.

Using the hallucination detection dataset 730, a model is trained to detect hallucination versus accurate generation, at step 750. The output of the model training step 750 is the hallucination pattern detection model.

When passing the data to the model that is not hallucinating at step 710, fact checking may be performed to ensure that the model is generating correct output, before labeling it as correct, as shown at step 740. If the fact checking step 740 identifies that the output is an actual hallucination, then it is marked as such and added to the hallucination detection dataset 730. At the completion of this process 700, a binary hallucination pattern classifier model is obtained that has been trained with two classes:

Hallucination

Not_Hallucination

Figure 8:
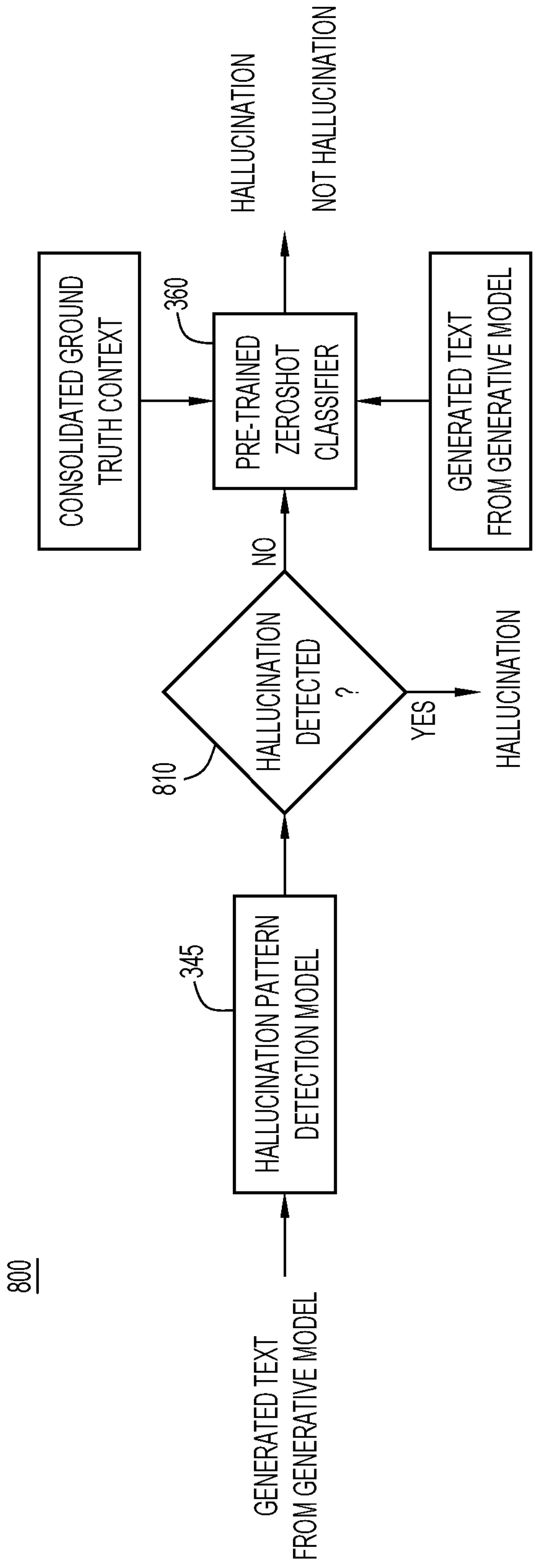
FIG. 8 is a flow diagram illustrating the use of the trained hallucination pattern detection model in the process depicted in FIG. 3, according to an example embodiment.

FIG. 8 depicts a process 800 that employs the hallucination pattern detection model obtained from the process of FIG. 7. The text generated by a generative model to be evaluated is applied as input to the hallucination pattern detection model 345. At step 810, the output of the application of the hallucination pattern detection model 345 is evaluated to determine whether a hallucination is detected. If a hallucination is detected based on the application of the generative text to the hallucination pattern detection model 345, then an output is generated as such and the process stops. If the hallucination pattern detection model 345 does not detect hallucination, then the process continues and the pre-trained zero-shot classifier 360 compares the generated text with the consolidated ground truth context (obtained by the process depicted in FIG. 5). The pre-trained zero-shot classifier 360 will declare a hallucination or not hallucination, and with an associated probability, as described above in connection with FIG. 6.

Thus, presented herein are a system and method to detect (and fact check) the output of a generative model to determine if it is hallucinating or not, as well as to check the factual accuracy of its output in an automated way. Additionally, if the zero-shot classifier marks the generated text as a hallucination, the original generative model may be asked/prompted to regenerate the text using different parameters like a lower temperature or a greater number of values from which to choose (e.g., a greater number of top-k values), so as to alter the operational behavior of the original generative model to prevent it from continuing to hallucinate. The consolidated ground truth can also be added as input context for the generative model to base its generation on-thereby not only providing a detection mechanism, but also enabling the generative model to 'fix' its answer.

The system and method presented herein do not rely on humans identifying any hallucinations. Rather, hallucinations are detected through the process described above. Namely, chunking, summarizing, topic extraction, and fact checking, to identify hallucinations created by the model. Trusted sources of information are used to fact-check and compare the fact-checked output with that of the generative output. Where a missed-fact is identified, that text can be re-generated, by using prompt engineering to tell the model the actual fact as identified during the fact-check phase.

Figure 9:
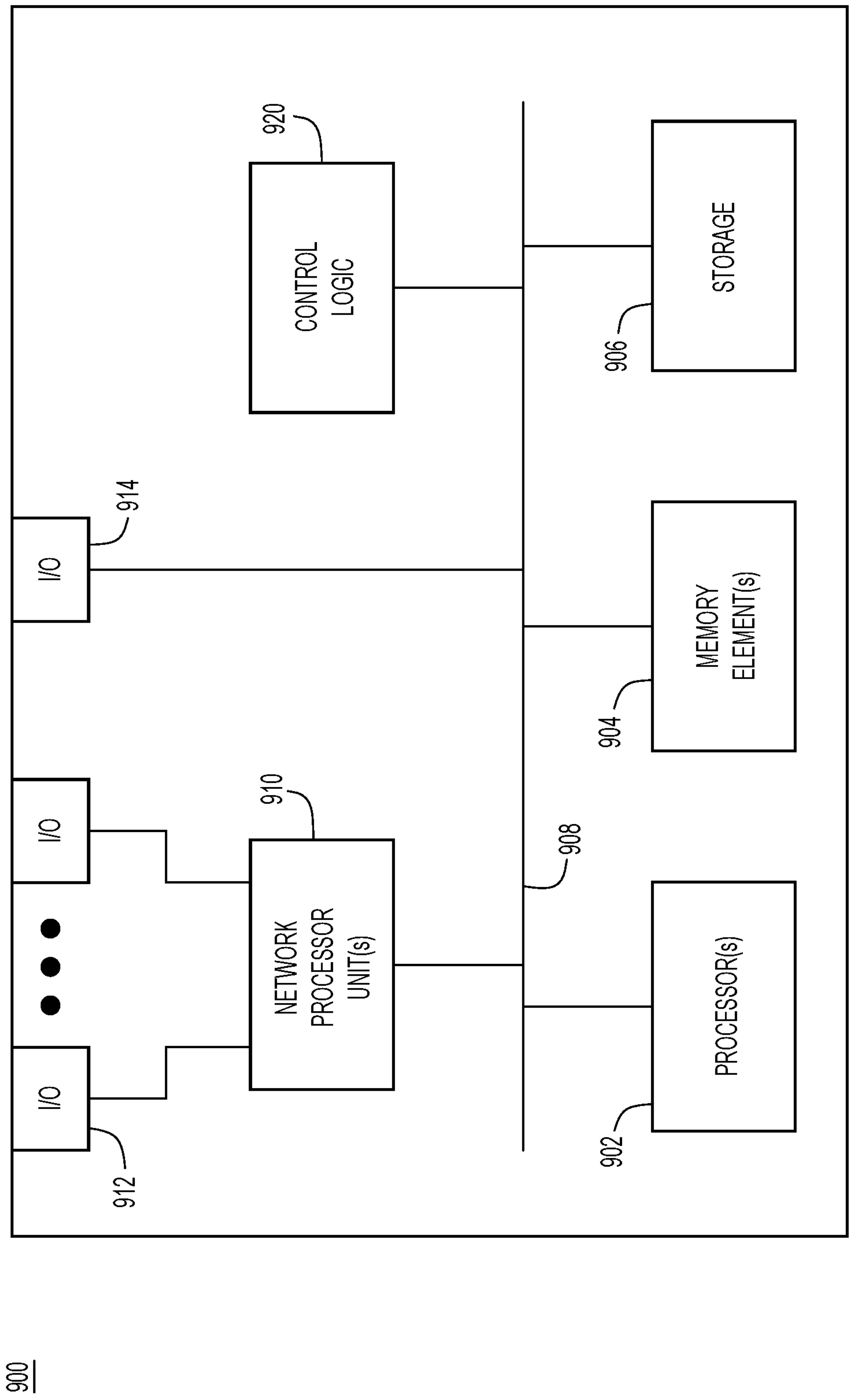
FIG. 9 is a hardware block diagram of a computing or networking device that may perform functions associated with any combination of operations in connection with the techniques depicted and described in connection with FIGS. 1-8, according to various example embodiments.

FIG. 9 is a hardware block diagram of a device (e.g., a computing device or multiple instances of such computing devices) that may perform functions associated with any combination of operations in connection with the techniques depicted in FIGS. 1-8, according to various example embodiments. It should be appreciated that FIG. 9 provides only an illustration of one example embodiment and does not imply any limitations with regard to the environments in which different example embodiments may be implemented. Many modifications to the depicted environment may be made.

In at least one embodiment, the computing device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a computer-implemented method for determining when a generative model is hallucinating, the method including: obtaining output produced by the generative model based on input provided to the generative model; performing summarization and topic extraction on the output to obtain one or more topics; performing fact checking on each of the one or more topics to produce a consolidated ground truth context; and declaring that the generative model is hallucinating or not based on the consolidated ground truth context.

In some aspects, the techniques described herein relate to a method, wherein the declaring includes: applying the output and the consolidated ground truth context to a pre-trained classifier that generates as output an indication of whether or not the output is indicative that the generative model is hallucinating.

In some aspects, the techniques described herein relate to a method, wherein the pre-trained classifier is a zero-shot classifier.

In some aspects, the techniques described herein relate to a method, further including: dividing the output into a plurality of text chunks, wherein performing summarization and topic extraction and performing fact checking are for each of the plurality of text chunks.

In some aspects, the techniques described herein relate to a method, wherein performing fact checking includes: for each of one or more facts for each of the plurality of text chunks, searching one or more public knowledge bases and/or one or more private knowledge bases to obtain a context for each searched knowledge base; and aggregating the context obtained from each searched knowledge base to obtain the consolidated ground truth context.

In some aspects, the techniques described herein relate to a method, further including: applying the input to the generative model and the output from the generative model to a hallucination pattern detection model that has been trained to detect a hallucination.

In some aspects, the techniques described herein relate to a method, wherein declaring includes declaring that the generative model is hallucinating based on an output of the hallucination pattern detection model.

In some aspects, the techniques described herein relate to a method, wherein when the output of the hallucination pattern detection model does not indicate that the generative model is hallucinating, further including: applying the output and the consolidated ground truth context to a pre-trained classifier that generates as output an indication of whether or not the output of the generative model is indicative that the generative model is hallucinating.

In some aspects, the techniques described herein relate to a method, further including training the hallucination pattern detection model by: providing a plurality of input prompts to a first generative model that is forced to hallucinate and to a second generative model that is allowed to operate as normal; performing fact checking on output of the second generative model and labelling factually correct output of the second generative model as not hallucination output; labelling output of the first generative model as hallucination output; generating a hallucination detection data set from labelled output of the first generative model and labelled output of the second generative model; and using the hallucination detection data set to train a model to produce the hallucination pattern detection model.

In some aspects, the techniques described herein relate to a method, further including: when it is declared that the generative model is hallucinating, providing a prompt to the generative model to regenerate the output using one or more changed operating parameters.

In some aspects, the techniques described herein relate to a method, wherein the one or more changed operating parameters include a lower operating temperature or a greater number of values from which to choose so as to alter operational behavior of the generative model to prevent it from continuing to hallucinate.

In some aspects, the techniques described herein relate to an apparatus including: a network interface that enables communication with one or more computing devices that runs a generative model; memory; and at least one processor coupled to the network interface and the memory, wherein the at least one processor is configured to execute instructions that cause the at least one processor to perform operations including: obtaining output produced by the generative model based on input provided to the generative model; performing summarization and topic extraction on the output to obtain one or more topics; performing fact checking on each of the one or more topics to produce a consolidated ground truth context; and determining that the generative model is hallucinating or not based on the consolidated ground truth context.

In some aspects, the techniques described herein relate to an apparatus, wherein the at least one processor performs the determining by: applying the output and the consolidated ground truth context to a pre-trained classifier that generates as output an indication of whether or not the output is indicative that the generative model is hallucinating.

In some aspects, the techniques described herein relate to an apparatus, wherein the at least one processor is configured to execute instructions that further cause the at least one processor to perform: applying the input to the generative model and the output from the generative model to a hallucination pattern detection model that has been trained to detect a hallucination.

In some aspects, the techniques described herein relate to an apparatus, wherein the at least one processor performs the determining by determining that the generative model is hallucinating based on an output of the hallucination pattern detection model.

In some aspects, the techniques described herein relate to an apparatus, wherein when the output of the hallucination pattern detection model does not indicate that the generative model is hallucinating, the at least one processor further executes instructions that cause the at least one processor to perform: applying the output and the consolidated ground truth context to a pre-trained classifier that generates as output an indication of whether or not the output of the generative model is indicative that the generative model is hallucinating.

In some aspects, the techniques described herein relate to one or more non-transitory computer readable storage media encoded with instructions that, when executed by at least one processor, cause the at least one processor to perform operations including: obtaining output produced by a generative model based on input provided to the generative model; performing summarization and topic extraction on the output to obtain one or more topics; performing fact checking on each of the one or more topics to produce a consolidated ground truth context; and determining that the generative model is hallucinating or not based on the consolidated ground truth context.

In some aspects, the techniques described herein relate to one or more non-transitory computer readable storage media, further including instructions that, when executed by the at least one processor, cause the at least one processor to perform: dividing the output into a plurality of text chunks, wherein performing summarization and topic extraction and performing fact checking are for each of the plurality of text chunks.

In some aspects, the techniques described herein relate to one or more non-transitory computer readable storage media, wherein performing fact checking includes: for each of one or more facts for each of the plurality of text chunks, searching one or more public knowledge bases and/or one or more private knowledge bases to obtain a context for each searched knowledge base; and aggregating the context obtained from each searched knowledge base to obtain the consolidated ground truth context.

In some aspects, the techniques described herein relate to one or more non-transitory computer readable storage media, further including instructions that, when executed by the at least one processor, cause the at least one processor to perform: applying the input to the generative model and the output from the generative model to a hallucination pattern detection model that has been trained to detect a hallucination, wherein determining includes determining that the generative model is hallucinating based on an output of the hallucination pattern detection model.

In some aspects, the techniques described herein may relate to a system comprising a generative model running on one or more servers; and a computing apparatus that is in communication with the one or more servers, the computing apparatus comprising at least one computing processor that executes instructions for a hallucination detection process that enables the computing apparatus to perform operations including: obtaining output produced by the generative model based on input provided to the generative model; performing summarization and topic extraction on the output to obtain one or more topics; performing fact checking on each of the one or more topics to produce a consolidated ground truth context; and determining that the generative model is hallucinating or not based on the consolidated ground truth context.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A computer-implemented method for determining when a generative model is hallucinating, comprising:
- obtaining output produced by the generative model deployed on a computing system, based on input provided to the generative model;
- performing summarization and topic extraction on the output to obtain one or more topics;
- performing fact checking on each of the one or more topics to produce a consolidated ground truth context;
- declaring that the generative model is hallucinating or not based on the consolidated ground truth context; and
- applying the input to the generative model and the output from the generative model to a hallucination pattern detection model,
- wherein declaring is based on output of the hallucination pattern detection model that has been trained to detect a hallucination by:
  - providing a plurality of input prompts to a first generative model that is forced to hallucinate and to a second generative model that is allowed to operate as normal;
  - performing fact checking on output of the second generative model and labelling factually correct output of the second generative model as not hallucination output;
  - labelling output of the first generative model as hallucination output;
  - generating a hallucination detection data set from labelled output of the first generative model and labelled output of the second generative model; and
  - using the hallucination detection data set to train a model to produce the hallucination pattern detection model; and
- when it is declared that the generative model is hallucinating, providing a prompt to the generative model indicating the hallucination and requesting the generative model to run on the computing system to regenerate the output using the prompt and/or using one or more changed operating parameters that alter operational behavior of the generative model running on the computing system.

2. The computer-implemented method of claim 1, wherein the declaring further comprises:

applying the output and the consolidated ground truth context to a pre-trained classifier that generates as output an indication of whether or not the output is indicative that the generative model is hallucinating.

3. The computer-implemented method of claim 2, wherein the pre-trained classifier is a zero-shot classifier.

4. The computer-implemented method of claim 1, further comprising:

dividing the output into a plurality of text chunks, wherein performing summarization and topic extraction and performing fact checking are for each of the plurality of text chunks.

5. The computer-implemented method of claim 4, wherein performing fact checking comprises:

for each of one or more facts for each of the plurality of text chunks, searching one or more public knowledge bases and/or one or more private knowledge bases to obtain a context for each searched knowledge base; and aggregating the context obtained from each searched knowledge base to obtain the consolidated ground truth context.

6. The computer-implemented method of claim 1, wherein declaring comprises declaring that the generative model is hallucinating based on an output of the hallucination pattern detection model.

7. The computer-implemented method of claim 6, wherein when the output of the hallucination pattern detection model does not indicate that the generative model is hallucinating, further comprising:

applying the output and the consolidated ground truth context to a pre-trained classifier that generates as output an indication of whether or not the output of the generative model is indicative that the generative model is hallucinating.

8. The computer-implemented method of claim 1, wherein the one or more changed operating parameters include a lower operating temperature or a greater number of values from which to choose so as to alter operational behavior of the generative model to prevent it from continuing to hallucinate.

9. An apparatus comprising:

a network interface that enables communication with one or more computing devices that runs a generative model;

memory; and at least one processor coupled to the network interface and the memory, wherein the at least one processor is configured to execute instructions that cause the at least one processor to perform operations including:

obtaining output produced by the generative model based on input provided to the generative model;

performing summarization and topic extraction on the output to obtain one or more topics;

performing fact checking on each of the one or more topics to produce a consolidated ground truth context;

determining that the generative model is hallucinating or not based on the consolidated ground truth context; and applying the input to the generative model and the output from the generative model to a hallucination pattern detection model, wherein determining is based on output of the hallucination pattern detection model that has been trained to detect a hallucination by:

providing a plurality of input prompts to a first generative model that is forced to hallucinate and to a second generative model that is allowed to operate as normal;

performing fact checking on output of the second generative model and labelling factually correct output of the second generative model as not hallucination output;

labelling output of the first generative model as hallucination output;

generating a hallucination detection data set from labelled output of the first generative model and labelled output of the second generative model; and using the hallucination detection data set to train a model to produce the hallucination pattern detection model; and when it is determined that the generative model is hallucinating, providing a prompt to the generative model indicating the hallucination and requesting the generative model to regenerate the output using the prompt and/or using one or more changed operating parameters that alter operational behavior of the generative model.

10. The apparatus of claim 9, wherein the at least one processor performs the determining by further:

applying the output and the consolidated ground truth context to a pre-trained classifier that generates as output an indication of whether or not the output is indicative that the generative model is hallucinating.

11. The apparatus of claim 10, wherein the pre-trained classifier is a zero-shot classifier.

12. The apparatus of claim 9, wherein the at least one processor is configured to execute instructions that cause the at least one processor to perform:

dividing the output into a plurality of text chunks, wherein performing summarization and topic extraction and performing fact checking are for each of the plurality of text chunks.

13. The apparatus of claim 9, wherein when the output of the hallucination pattern detection model does not indicate that the generative model is hallucinating the at least one processor further executes instructions that cause the at least one processor to perform:

applying the output and the consolidated ground truth context to a pre-trained classifier that generates as output an indication of whether or not the output of the generative model is indicative that the generative model is hallucinating.

14. One or more non-transitory computer readable storage media encoded with instructions that, when executed by at least one processor, cause the at least one processor to perform operations including:

obtaining output produced by a generative model deployed on a computing system based on input provided to the generative model;

performing summarization and topic extraction on the output to obtain one or more topics;

performing fact checking on each of the one or more topics to produce a consolidated ground truth context;

determining that the generative model is hallucinating or not based on the consolidated ground truth context; and applying the input to the generative model and the output from the generative model to a hallucination pattern detection model, wherein determining is based on output of the hallucination pattern detection model that has been trained to detect a hallucination by:

providing a plurality of input prompts to a first generative model that is forced to hallucinate and to a second generative model that is allowed to operate as normal;

performing fact checking on output of the second generative model and labelling factually correct output of the second generative model as not hallucination output;

labelling output of the first generative model as hallucination output;

generating a hallucination detection data set from labelled output of the first generative model and labelled output of the second generative model; and using the hallucination detection data set to train a model to produce the hallucination pattern detection model; and when it is determined that the generative model is hallucinating, providing a prompt to the generative model indicating the hallucination and requesting the generative model to run on the computing system to regenerate the output using the prompt and/or using one or more changed operating parameters that alter operational behavior of the generative model running on the computing system.

15. The one or more non-transitory computer readable storage media of claim 14, further comprising instructions that, when executed by the at least one processor, cause the at least one processor to perform:

dividing the output into a plurality of text chunks, wherein performing summarization and topic extraction and performing fact checking are for each of the plurality of text chunks.

16. The one or more non-transitory computer readable storage media of claim 15, wherein performing fact checking comprises:

for each of one or more facts for each of the plurality of text chunks, searching one or more public knowledge bases and/or one or more private knowledge bases to obtain a context for each searched knowledge base; and aggregating the context obtained from each searched knowledge base to obtain the consolidated ground truth context.

17. The one or more non-transitory computer readable storage media of claim 14, wherein when the output of the hallucination pattern detection model does not indicate that the generative model is hallucinating, further comprising:

applying the output and the consolidated ground truth context to a pre-trained classifier that generates as output an indication of whether or not the output of the generative model is indicative that the generative model is hallucinating.

18. The one or more non-transitory computer readable storage media of claim 17, wherein the pre-trained classifier is a zero-shot classifier.

19. The one or more non-transitory computer readable storage media of claim 14, wherein the one or more changed operating parameters include a lower operating temperature or a greater number of values from which to choose so as to alter operational behavior of the generative model to prevent it from continuing to hallucinate.

20. The apparatus of claim 9, wherein the one or more changed operating parameters include a lower operating temperature or a greater number of values from which to choose so as to alter operational behavior of the generative model to prevent it from continuing to hallucinate.

* * * * *